J. B. Johnston,
Churn.
No. 99,206.  Patented Jan. 25, 1870.
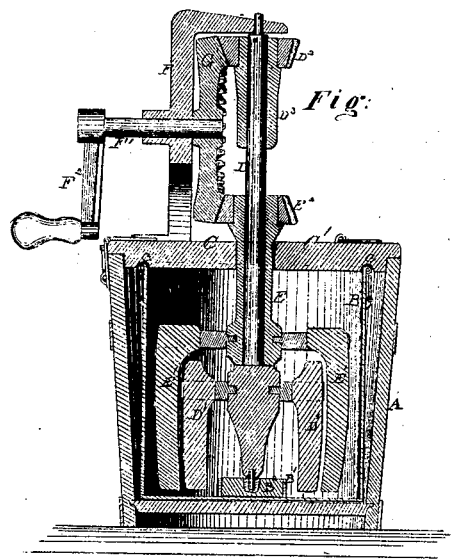
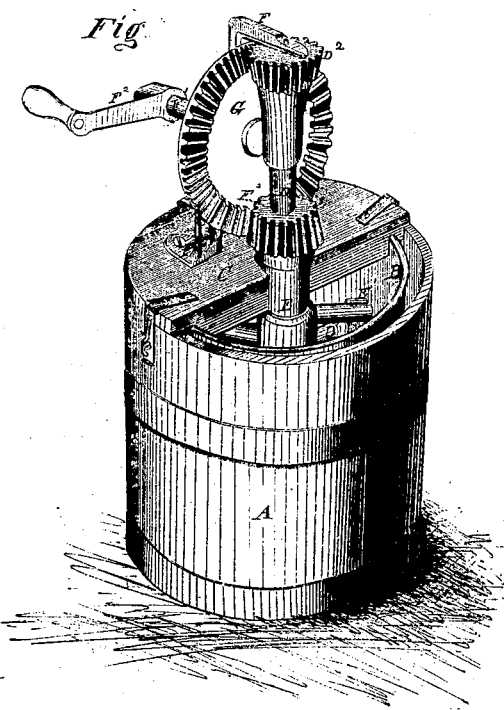

United States Patent Office.

JOSEPH B. JOHNSTON, OF ST. MATTHEWS, KENTUCKY.

Letters Patent No. 99,206, dated January 25, 1870.

IMPROVEMENT IN CHURNS.

The Schedule referred to in these Letters Patent and making part of the same.

*To all whom it may concern:*

Be it known that I, JOSEPH B. JOHNSTON, of St. Matthews, in the county of Jefferson, and State of Kentucky, have invented new and useful Improvements in Churns; and I do hereby declare that the following is a full, clear, and exact description thereof, reference being had to the annexed drawings, making part of this specification, in which—

Figure 1 is a central vertical section.

Figure 2 is a perspective view, one section of the lid or cover being removed from the churn.

The same letters are employed in both figures to designate identical parts.

This invention relates to churns of that class which has a vessel for receiving the cream to be churned, placed within another vessel, with a space between them, so that the vessel containing the cream may be surrounded by either warm or cold water, to impart to the cream any desired temperature.

My improvements consist in the construction, combination, and arrangement of some of the parts pertaining to such a churn, as hereinafter more fully set forth.

To enable those skilled in the art to make and use my invention, I will proceed to describe its construction and operation.

A, in the drawings, represents a cylindrical vessel, which may be made of wood, and hooped with metallic bands. Its lower end is closed by a permanent head, and its upper end by a removable lid.

B represents the inner vessel, in which the cream is placed to be churned. I prefer to make this vessel of tin, so that it readily transmits heat. Its form is similar to that of the outer vessel, being, however, a little smaller, its height being such, that when placed in the outer vessel, it reaches to near the top thereof.

An annular flange, $B^1$, is soldered centrally upon its bottom, to receive the socket in which the dasher-spindle is pivoted.

This socket, $B^2$, may consist of a block of wood fitting tightly in the annular flange, with a metallic bush in the centre, to receive the end of the spindle. The upper end of this vessel is provided with handles, by which it may be lifted out of the outer one.

C C' represent two semicircular disks, together constituting the lid or cover for both the exterior vessel A and the cream-vessel B. This cover rests, by an annular flange, upon the top of the vessel A, which it enters a short distance, and has an annular groove, $c$, formed in its under surface, which is entered by the upper end of the cream-vessel, which is thus held in a central position, within the outer vessel, solely by this cover. It is provided with an aperture in its centre, through which the dasher-rods pass.

D represents a vertical spindle, pivoted at its lower end in the socket $B^2$, and at its upper end in the frame F, soon to be described.

The dashers $D^1$ are firmly secured to the lower, somewhat-enlarged portion of the spindle, and revolve with it.

$D^2$ is a bevel-wheel, secured upon a sleeve, $D^3$, which is placed on the upper end of the spindle, and held in position thereon by a set-screw or a bolt passing through perforations in the sleeve and shaft.

E represents a hollow shaft, fitting snugly over the spindle D, yet so that it can revolve freely thereon.

Near its lower end, which rests upon the enlarged portion of the spindle, it carries the dashers $E^1$, which revolve outside of the dashers $D^1$, and in an opposite direction.

Upon the upper end of this hollow shaft, a bevel-wheel, $E^2$, facing the wheel $D^2$, and of the same pitch and diameter as this, is secured. The arrangement of these bevel-wheels is such that both mesh into and are driven by the same driving-wheel G; and thus the dashers $D^1$ and $E^1$ are revolved in opposite directions, which will have the effect of breaking up the globules of the cream, and making butter in a very short time.

F represents a frame of metal mounted upon the part C of the cover, the latter being held to the vessel A by means of hooks and staples, as shown.

A horizontal arm extends from the top of this frame, in which the spindle D is pivoted. Just above the point where it is branched to form the legs, a hub is formed on it, through which a hole is bored for the reception of a shaft, $F^1$, which has its bearings therein. Said shaft is provided, at its outer end, with a crank, $F^2$, by which to turn it.

This shaft projects a short distance through the frame, toward the spindle D, and upon this portion the driving bevel-wheel G is secured, so as to mesh into the wheels $D^2$ and $E^2$.

It will be seen that the churn described can be taken apart with ease when it is desired to cleanse its several parts, and that it can just as easily be put together again. To take it apart, it is only necessary to unhook the portion C of the cover, when it may be lifted off, together with the dashers. The latter can also be taken apart by first withdrawing the spindle out of the frame, and then removing the screw or bolt holding the sleeve $D^3$ to the spindle, when said sleeve, with its wheel, may be slipped off, as also the hollow shaft E, with its wheel and dashers.

What I claim as new, and desire to secure by Letters Patent, is—

1. The cover C C', constructed with a groove, $c$, in its under surface, substantially as and for the purpose set forth.

2. The combination of the cover C C' and the vessels A and B, substantially as and for the purpose set forth.

3. A churn, combining in its construction an outer vessel A, inner vessel B, cover C C', spindle D, with dashers $D^1$, revolving in one direction, and a hollow shaft, E, with dashers $E^1$ placed upon, but revolving in an opposite direction to said spindle, substantially as shown and described.

In testimony whereof, I have signed my name to this specification, in the presence of two subscribing witnesses.

JOSEPH B. JOHNSTON.

Witnesses:
    JOHN BURKS,
    JOHN FERGUSON.